United States Patent [19]

Raines et al.

[11] Patent Number: 4,938,848
[45] Date of Patent: Jul. 3, 1990

[54] METHOD AND APPARATUS FOR CONVEYING SPLIT STREAMS OF ALUMINA POWDER TO AN ELECTROLYSIS CELL

[75] Inventors: Dennis R. Raines; John D. Latvaitis; Boris M. Triko, all of Maryville, Tenn.

[73] Assignee: Aluminum Company of America, Pittsburgh, Pa.

[21] Appl. No.: 309,199

[22] Filed: Feb. 13, 1989

[51] Int. Cl.$^5$ ............... C25C 3/06; C25C 3/14; B65G 53/40; B65G 53/14
[52] U.S. Cl. ........................ 204/67; 204/245; 204/247; 406/123; 406/125; 406/130; 406/144; 406/152; 406/153; 406/181; 406/194
[58] Field of Search .................. 204/245–247, 204/67; 406/123, 125, 144, 130, 152, 153, 181, 194

[56] References Cited
U.S. PATENT DOCUMENTS

| | | | |
|---|---|---|---|
| 3,681,229 | 8/1972 | Lowe | 204/246 X |
| 4,009,912 | 3/1977 | Mraz | 406/144 |
| 4,016,053 | 4/1977 | Stankovich et al. | 204/67 |
| 4,186,772 | 2/1980 | Handleman | 406/153 X |
| 4,435,255 | 3/1984 | Casdas | 204/245 X |
| 4,450,053 | 5/1984 | Merz et al. | 204/67 |
| 4,453,866 | 6/1984 | Ryan | 406/181 X |
| 4,525,105 | 6/1985 | Jaggi | 406/50 |
| 4,560,094 | 12/1985 | Eales | 406/123 X |
| 4,562,968 | 1/1986 | Widmer et al. | 406/181 X |
| 4,692,068 | 9/1987 | Hanrot et al. | 406/89 |

Primary Examiner—Donald R. Valentine
Attorney, Agent, or Firm—Glenn E. Klepac

[57] ABSTRACT

An apparatus and method for splitting a mass of fluidizable powder into a plurality of powder streams and conveying the powder streams through a plurality of ducts. The apparatus comprises a powder splitter defining a chamber, a plurality of hollow ducts each having an entrance communicating with the chamber, and a gas source including a plurality of gas nozzles within the ducts and directed outwardly of the chamber. The gas nozzles propel gas jets into the ducts so that portions of the fluidizable powder are conveyed through the ducts. A particularly preferred apparatus is utilized for conveying a plurality of alumina powder streams to an aluminum electrolysis cell.

20 Claims, 3 Drawing Sheets

METHOD AND APPARATUS FOR CONVEYING SPLIT STREAMS OF ALUMINA POWDER TO AN ELECTROLYSIS CELL

FIELD OF THE INVENTION

The present invention relates to apparatus and methods for transferring powders from one location to another. More specifically, the invention pertains to the transfer of split streams of powdered alumina from a storage tank to an aluminum electrolysis cell.

BACKGROUND OF THE INVENTION

Conveyor systems for transferring powdered ore from storage tanks to bins associated with electrolytic cells are known in the prior art. However, these prior art conveyor systems are generally not capable of continuously splitting powdered ore into a plurality of powder stream portions having controlled size and then conveying such powder stream portions to separate parts of an electrolytic cell. The ability to feed an electrolytic cell with split powder streams has been found to benefit the efficiency of cell operation.

Some prior art patents disclosing conveyor systems for transferring alumina ore to electrolytic cells are Stankovich et al U.S. Pat. No. 4,016,053; Merz et al U.S. Pat. No. 4,450,053; Jaggi U.S. Pat. No. 4,525,105; and Hanrot et al U.S. Pat. No. 4,692,068. None of such patents discloses an apparatus for splitting a mass of fluidizable powder into a plurality of powder streams and then conveying such powder streams through a plurality of ducts in a manner similar to operation of the present invention.

It is a principal object of the present invention to provide an apparatus and method for splitting a mass of fluidizable powder into a plurality of powder streams and for conveying such powder streams through a plurality of ducts.

A related objective of the invention is to provide a method for feeding alumina powder to an electrolytic cell utilizing the apparatus of the present invention.

Additional objects and advantages of the present invention will become apparent to persons skilled in the art from the following specification considered in connection with the drawings.

SUMMARY OF THE INVENTION

The present invention is directed to an improved apparatus and method for transferring a fluidizable powder from a single container to a plurality of other locations. The invention may be adapted for use in many industrial processes wherein powdered materials are now transported by means of conveyor systems. A preferred embodiment has been designed for usage in connection with feeding of alumina to an electrolytic cell wherein aluminum metal is produced.

The apparatus of the invention comprises a powder splitter or splitter box defining a chamber, a plurality of hollow ducts connected with the chamber, and a gas source for propelling powder away from the chamber and through the ducts. The housing comprising a lower end wall, an upper end wall spaced upwardly from the lower end wall and at least one side wall connecting the upper and lower end walls. The upper end wall defines an inlet opening through which powder is introduced from a storage tank.

The hollow ducts each have an entrance communicating with the chamber and an exit spaced from the housing. The duct entrance preferably comprises an opening in a lower portion of each duct. In a preferred embodiment, the duct exits are located in an aluminum electrolysis cell.

In order to prevent electrical communication with the cell, the ducts are preferably made from an electrically insulating material. Ceramic materials are preferred. A particularly preferred set of ducts has a lining comprising principally (about 99.9 wt %) alpha alumina.

The gas source includes a gas nozzle within each of the ducts directed outwardly of the chamber. Each gas nozzle has an outlet orifice spaced outwardly of a duct entrance. The gas nozzles propel gas jets into the ducts so that gas pressure is reduced in the ducts relative to the chamber. As a result, portions of the powder are drawn into the reduced pressure areas and thereby conveyed through each of the ducts.

In a preferred embodiment of the apparatus, a fluidizing means communicating with the chamber maintains the powder in a fluidized state. The fluidizing means comprises a porous panel adjacent the chamber and a fluidizing nozzle carrying pressurized gas through the porous panel into the chamber. A preferred panel is made from polyester fabric.

The fluidizable powder preferably comprises alumina powder having an average particle size of about 50–200 microns. The alumina powder usually has a nominal average particle size of about 100 microns with a broad size distribution. The apparatus is also suitable for use with other solid powders having similar particle sizes.

DETAILED DESCRIPTION OF A PREFERRED EMBODIMENT

Figure 1:
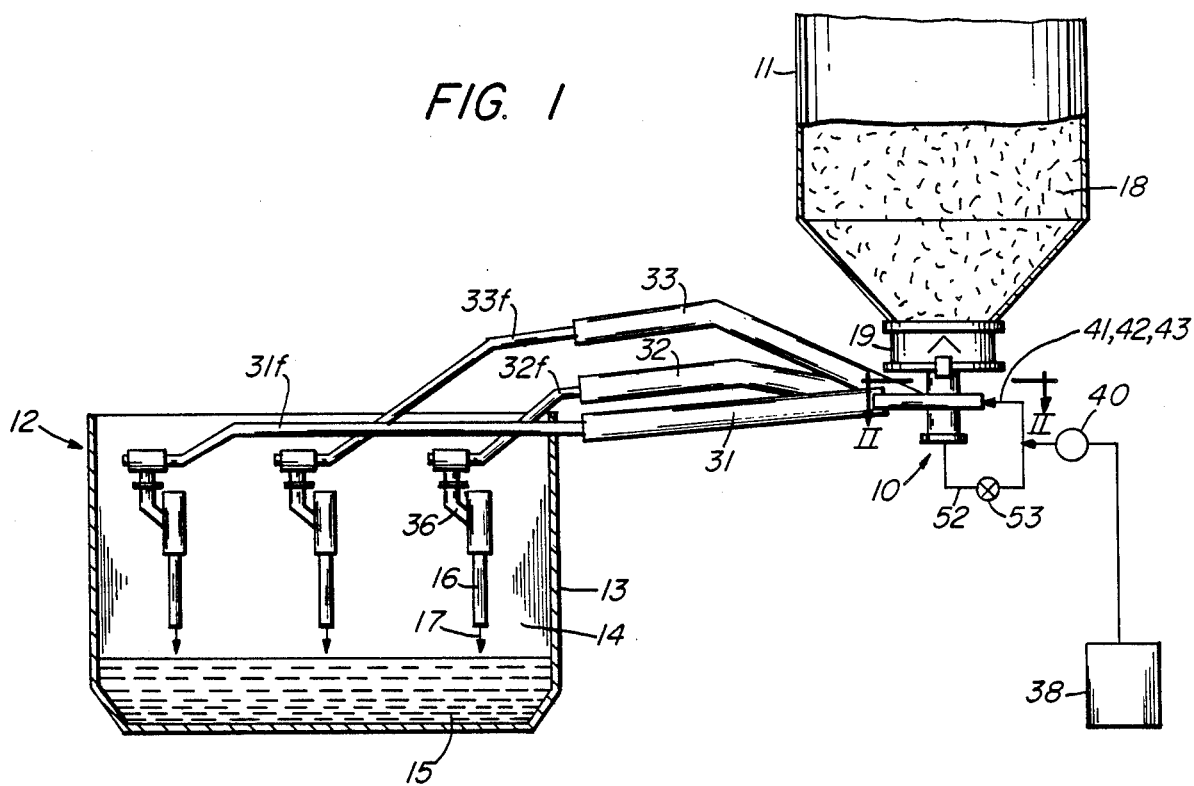
FIG. 1 is a schematic, front elevational view partly in cross-section, of a preferred apparatus constructed in accordance with the present invention in association with an aluminum electrolysis cell.

A preferred embodiment of the apparatus of the invention is illustrated schematically in FIG. 1. The apparatus 10 is used for feeding alumina powder from a day tank or storage tank 11 into an aluminum electrolysis cell 12.

The cell 12 includes an enclosure 13 defining a cell interior 14 in which there is an electrolyte 15. The electrolyte 15 constitutes a bath of molten synthetic cryolite containing dissolved alumina ore. Carbon electrodes (not shown) pass electric current through the electrolyte to produce molten aluminum metal.

Operation of the cell 12 involves feeding powdered alumina ore at frequent intervals from the tank 11 to the cell interior 14. The ore is generally introduced into the electrolyte 15 by depositing powdered ore onto a layer of crust formed over the bath and by periodically breaking in a portion of the crust from above. The ore may be released into the cell interior 14 through a hollow housing 16 surrounding a solid plunger 17 of a crust-breaking apparatus. Various gaseous and particulate effluents evolved during operation of the cell 12 are recovered through outlets and vents (not illustrated) communicating with the cell interior 14.

The day tank 11 holds a large mass of fluidizable alumina powder 18 having an average particle size of approximately 100 microns. The tank 11 is connected with a powder container 19 also filled with alumina powder 18.

Figure 3:
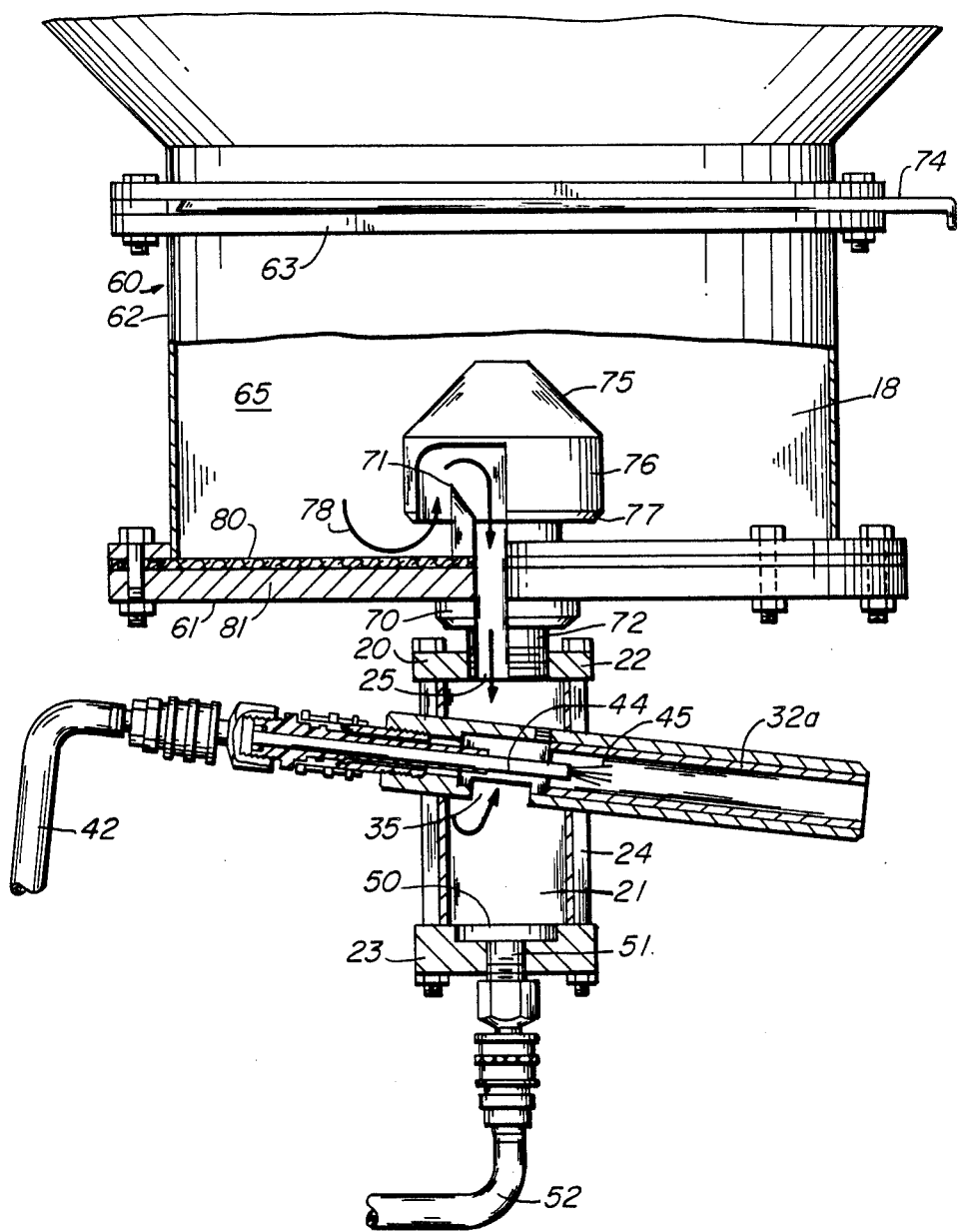
FIG. 3 is an enlarged, fragmentary cross-sectional view of the powder container and powder splitter shown in FIG. 1.

Referring now more particularly to FIG. 3, the apparatus 10 includes a powder splitter or splitter box or splitter 20 enclosing a chamber 21. The splitter 20 comprises a top end wall 22, a bottom end wall 23, and side walls 24 interconnecting the top and bottom walls 22, 23. The top end wall 22 defines an inlet opening 25 for receiving alumina powder from above.

Figure 2:
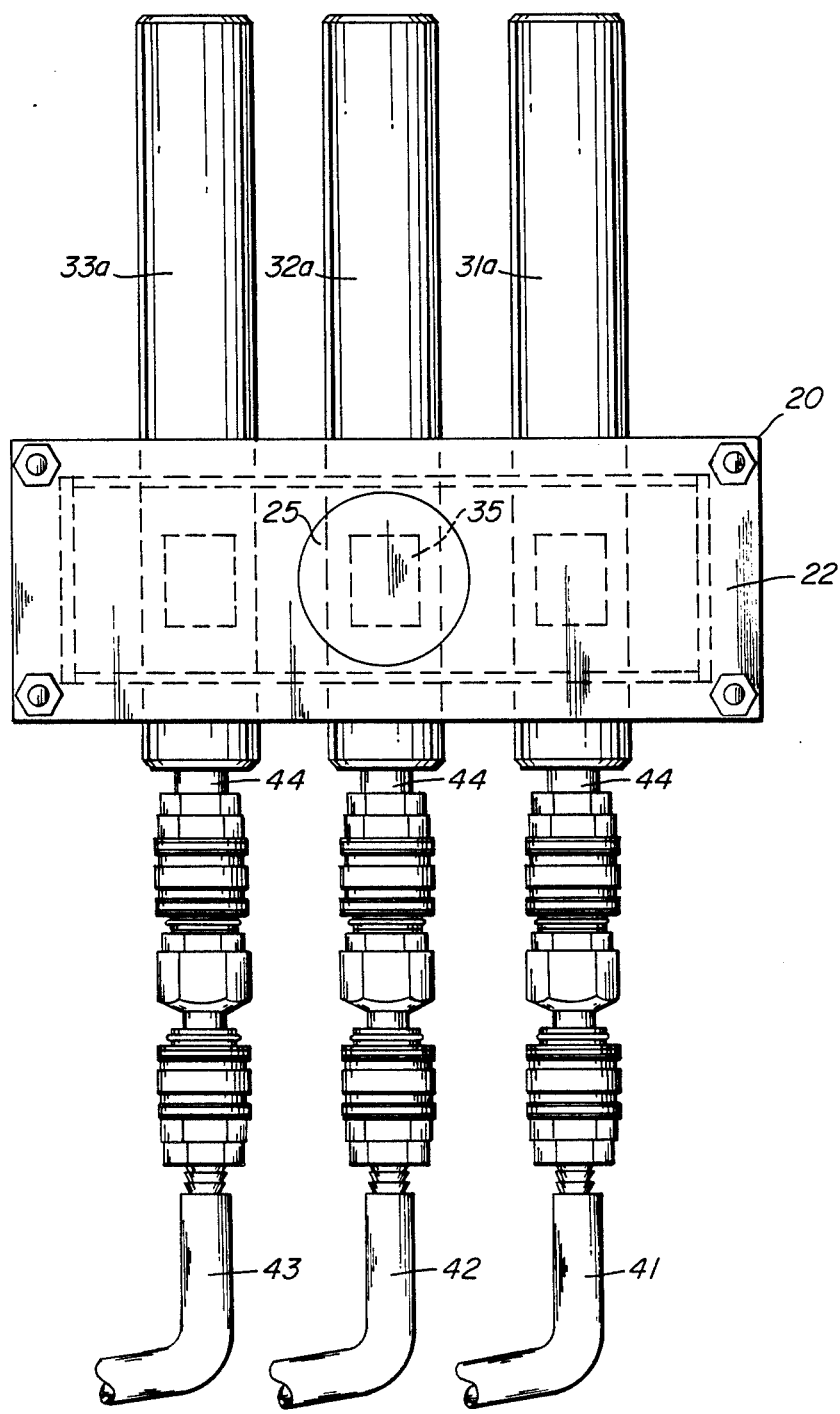
FIG. 2 is an enlarged, fragmentary cross-sectional view taken along the lines II—II of FIG. 1.

As shown in FIGS. 1 and 2, there are three hollow ducts 31, 32, 33 connecting the apparatus 10 and electrolytic cell 12. Proximal duct portions 31a, 32a, 33a adjacent the apparatus 10 are made from alpha alumina. Distal duct portions 31b, 32b, 33b adjacent the cell 12 are cast iron pipes. It is desirable to make at least portions of the ducts 31, 32, 33 from an electrically insulating material because of the large difference in electrical potential between the tank 11 and cell 12. This difference can be as large as 1,000 volts DC and constitutes a potentially serious safety hazard. Alpha alumina is a known insulating material which obviates the danger of electric shock in the vicinity of the apparatus 10. Alpha alumina is also highly resistant to abrasion by the powder. Even when duct abrasion occurs, no undesirable impurities are introduced into the cell 12.

Referring now to FIGS. 1 and 3, each of the ducts has a duct entrance 35 communicating with the chamber 21 and a duct exit 36 in the cell 12. Each duct entrance 35 preferably comprises an opening in a lower portion of one of the ducts. This location reduces the likelihood of clogging during operation.

The apparatus 10 is powered by a compressed air pump 38 which provides compressed air at 60 psig. A control solenoid 40 controls the flow of pressurized air through high pressure conduits 41, 42, 43. The high pressure conduit 42 shown in FIG. 3 terminates in a gas nozzle 44 having an outlet orifice 45. The flow of an air jet 46 through the nozzle 44 has a venturi effect wherein air pressure in the duct 32 and duct entrance 35 is reduced relative to the chamber 21. Such reduction in air pressure causes alumina powder in the chamber 21 to pass in portions through each of the duct entrances 35 into ducts 31, 32, 33 and then onward into the cell 12.

The preferred apparatus illustrated also includes a fluidizing means for fluidizing alumina powder in the chamber 21. The fluidizing means comprises a polyester fabric panel 50 and a fluidizing plenum 51 for carrying pressurized air through the panel 50 into the chamber 21. A low pressure conduit 52 supplies air at a pressure of about 3 psig to the fluidizing plenum 51. A pressure reduction valve 53 controls pressure within the conduit 52.

As shown in FIG. 3, alumina powder 18 drops downwardly from the day tank 11 into a powder container 60, located above and adjacent to the powder splitter 20. The powder container 60 has a floor 61, side walls 62, and top wall 63, all defining an interior portion or interior 65. A hollow powder conduit 70 extends between the container 60 and splitter 20. The conduit 70 has a proximal opening 71 above the floor 61 and a distal portion 72 connected with the inlet opening 25 of the splitter 20.

A manually operated slide gate 74 is provided between the day tank 11 and powder container 60. The slide gate 74 is normally open but may be closed at times when it is desired to empty the container 60 and splitter 20 for maintenance or repair. A valve cover 75 overlies the proximal opening 71. The valve cover 75 includes a generally cylindrical lower portion 76 having a lower edge or lower edge portion 77 spaced downwardly of the conduit opening 71 and upwardly from the floor 61. The floor 61, conduit 70, and valve cover 75 define a tortuous, generally S-shaped powder path 78 connecting the interior portion 65 with the conduit 70. The valve cover 75 normally prevents powder 18 from entering the conduit 70. However, activation of the air jets 46 reduces air pressure in the conduit 70 so that fluidized, air-entrained powder flows along the path 78 and through the conduit opening 71 into the conduit 70. When the air jets 46 are turned off, powder flow from the container 60 soon ceases as air pressures are equalized in the container 60 and conduit 70.

A porous fabric panel 80 covers the interior side of the container floor 61. The floor 61 defines a shallow cavity or fluidizing plenum 81 below the panel 80. The porous panel 80 allows air to enter the interior 65 when the apparatus is activated, thereby improving flow of powder adjacent the plenum 81 and along the path 78 into the conduit 70.

The apparatus described above is inexpensive to install and operate. In addition, maintenance costs are low because the apparatus contains no moving parts. The apparatus can be computer controlled for total alumina powder delivery weights ranging from 5 pounds to 45 pounds in increments of 0.455 pound on demand with no manual intervention.

The apparatus is capable of handling alumina powders having a wide range of average particle sizes. Because of segregation inadvertently occurring during handling, such powders frequently contain a high proportion of fine material having an average particle size below about 44 microns. Surprisingly, the apparatus has been found to be virtually problem-free, even when handling alumina powder containing a high proportion (e.g., about 5-35 wt %) of fine material having an average particle size of less than about 44 microns.

While the invention has been described in terms of preferred embodiments, the claims appended hereto are intended to encompass all embodiments which fall within the spirit of the invention.

What is claimed is:

1. Apparatus for slitting a mass of fluidizable powder into a plurality of powder streams and for conveying said powder streams through a plurality of ducts, said apparatus comprising:
    (a) a powder splitter defining a chamber and an inlet opening for receiving powder into said chamber,
    (b) a plurality of hollow ducts for conveying powder away from the chamber, each said ducts having an entrance communicating with said chamber and an exit spaced outwardly from said, powder splitter,
    (c) a gas source including a plurality of gas nozzles within said ducts and directed outwardly of said chamber, each said gas nozzles having an outlet orifice spaced outwardly of a duct entrance, said gas nozzles propelling gas jets into said ducts and thereby conveying portions of the powder through said ducts, and (d) fluidizing means communicating with the chamber for fluidizing said powder therein, said fluidizing means comprising:
  (1) a porous panel adjacent said chamber, and
  (2) a fluidizing plenum for carrying pressurized gas through said panel into said chamber.

2. An apparatus as claimed in claim 1 wherein said powder splitter comprises an upper end wall, a lower end wall, and at least one side wall connecting said upper and lower end walls, said upper end wall defining said inlet opening.

3. An apparatus as claimed in claim 1 wherein each said ducts comprises an electrically insulating material.

4. An apparatus as claimed in claim 1 wherein each said duct includes at least a portion lined with a ceramic material.

5. An apparatus as claimed in claim 1 wherein each said ducts includes a portion lined with alpha alumina.

6. An apparatus as claimed in claim 1 wherein each said duct exit is located in an aluminum electrolysis cell.

7. An apparatus as claimed in claim 1 wherein said entrance comprises an opening in a lower portion of each said ducts.

8. An apparatus as claimed in claim 1 further comprising:
  (e) means for adjusting the pressure and volume of gas flowing through each said gas nozzles.

9. An apparatus as claimed in claim 1 further comprising:
  (e) a powder container adjacent said powder splitter, said powder container having an interior for containing powder,
  (f) a conduit extending between said powder container and said powder splitter, said conduit having a proximal opening communicating with the interior of said powder container and a distal portion connected with the inlet opening of said powder splitter, and
  (g) a valve cover spaced from said proximal opening, said valve cover denying entry of powder into said proximal opening until the gas source is activated.

10. An apparatus as claimed in claim 9 wherein said powder container has a floor spaced upwardly of said powder splitter and said valve cover includes a lower edge portion spaced downwardly of the proximal opening of said conduit and upwardly of said floor; said floor, said conduit, and said valve cover defining in combination a tortuous path along which powder travels from said powder container interior into said conduit upon activation of said gas source 11. Apparatus for conveying alumina powder portions to an aluminum electrolysis cell comprising:
  (a) a powder container having an interior portion containing alumina powder,
  (b) a powder splitter having a chamber, said powder splitter being spaced downwardly of said powder container,
  (c) a conduit extending between said powder container and said powder splitter, said conduit having an open proximal portion extending upwardly into the interior portion of said powder container,
  (d) a valve cover overlying said proximal portion of the conduit and spaced therefrom,
  (e) a plurality of hollow ducts for conveying alumina powder away from said chamber, each said ducts having an entrance communicating with said chamber and an exit in an aluminum electrolysis cell, and
  (f) a gas source including a plurality of gas nozzles within said ducts and directed outwardly of said chamber, each said gas nozzles having an outlet orifice spaced outwardly of a duct entrance, said gas nozzles propelling gas jets into said ducts, and thereby conveying powder portions through said ducts and into said cell.

12. A method for splitting a mass of fluidizable powder into a plurality of powder streams and for conveying said powder streams through a plurality of ducts, comprising the steps of:
  (a) introducing a mass of fluidizable powder into a chamber communicating with a plurality of hollow ducts, each said ducts having an entrance communicating with said chamber and an exit spaced outwardly from said entrance,
  (b) fluidizing the powder in the chamber by carrying a pressurized gas from a fluidizing plenum through a porous panel and into said chamber,
  (c) propelling gas jets through a plurality of nozzles directed outwardly of said chamber and into said ducts, each said nozzles having an outlet orifice spaced outwardly of a duct entrance, thereby reducing the gas pressure in said ducts relative to the gas pressure in said chamber, and
  (d) conveying portions of the powder through each said ducts.

13. A method as claimed in claim 12 wherein said fluidizable powder comprises alumina powder having an average particle size of about 50–200 microns.

14. A method as claimed in claim 13 wherein about 5–35 wt % of said alumina powder has an average particle size of less than about 44 microns.

15. A method as claimed in claim 12 wherein said entrance is formed in a lower portion of each said ducts.

16. A method as claimed in claim 12 wherein said fluidizable powder comprises alumina powder and said ducts convey the alumina powder to an aluminum electrolysis cell.

17. A method as claimed in claim 12 further comprising:
  (e) holding a mass of the fluidizable powder in a powder container adjacent said chamber, said powder container being connected to said chamber by a conduit having an inlet opening,
    and wherein step (a) comprises introducing said powder through said inlet opening into said chamber.

18. A method as claimed in claim 12 wherein step (d) comprises conveying said portions of the powder to duct exits in an aluminum electrolysis cell.

19. A method as claimed in claim 18 wherein each said ducts comprises an electrically insulating material.

20. A method as claimed in claim 18 wherein each said ducts includes at least a portion lined with a ceramic material.

* * * * *